US012388542B2

(12) United States Patent
Liu et al.

(10) Patent No.: US 12,388,542 B2
(45) Date of Patent: Aug. 12, 2025

(54) REFERENCE SIGNAL RECEIVED QUALITY FOR FULLY LOADED REFERENCE SIGNALS

(71) Applicant: QUALCOMM Incorporated, San Diego, CA (US)

(72) Inventors: Le Liu, San Jose, CA (US); Alberto Rico Alvarino, San Diego, CA (US); Carlos Cabrera Mercader, Cardiff, CA (US); Mungal Singh Dhanda, Slough (GB); Umesh Phuyal, San Diego, CA (US); Yuksel Ozan Basciftci, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 17/819,906

(22) Filed: Aug. 15, 2022

(65) Prior Publication Data

US 2023/0052368 A1  Feb. 16, 2023

Related U.S. Application Data

(60) Provisional application No. 63/260,304, filed on Aug. 16, 2021.

(51) Int. Cl.
H04B 17/318 (2015.01)
H04W 24/08 (2009.01)

(52) U.S. Cl.
CPC .......... H04B 17/318 (2015.01); H04W 24/08 (2013.01)

(58) Field of Classification Search
CPC .............................. H04B 17/318; H04W 24/08
See application file for complete search history.

(56) References Cited

U.S. PATENT DOCUMENTS

| 2011/0110251 A1* | 5/2011 | Krishnamurthy ... H04W 72/541 370/252 |
| 2016/0218816 A1 | 7/2016 | Horiuchi et al. |
| 2018/0048444 A1* | 2/2018 | Park ..................... H04L 5/0053 |

FOREIGN PATENT DOCUMENTS

EP    2665332 A1    11/2013

OTHER PUBLICATIONS

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3rd Generation Partnership Project, Mobile Competence Centre, 650, Route Des Lucioles, F-06921 Sophia-Antipolis Cedex, France, Jul. 6, 2021, pp. 1-959, XP052030220, p. 448-p. 469.

(Continued)

Primary Examiner — Natasha W Cosme
(74) Attorney, Agent, or Firm — Harrity & Harrity, LLP

(57) ABSTRACT

Various aspects of the present disclosure generally relate to wireless communication. In some aspects, a user equipment (UE) may measure a reference signal received power (RSRP) associated with a reference signal (RS) broadcast by a network. The UE may further measure a received signal strength indicator (RSSI) using a plurality of resource elements (REs) that do not include the RS and excluding REs that do include the RS. Accordingly, the UE may determine a reference signal received quality (RSRQ) associated with the RS based at least in part on the RSRP and the RSSI. Numerous other aspects are described.

26 Claims, 10 Drawing Sheets

(56) References Cited

OTHER PUBLICATIONS

Broadcom Corporation: "RSRQ Calculation for Small Cell On/Off", 3GPP TSG-RAN WG1 Meeting #76bis, R1-141505 Small Cell RSRQ Calculation, 3rd Generation Partnership Project, Mobile Competence Centre, 650, Route Des Lucioles, F-06921 Sophia-Antipolis Cedex, France, vol. RAN WG1, No. Shenzhen, China, Mar. 31, 2014-Apr. 4, 2014, Mar. 30, 2014, XP050787174, 4 Pages.
International Search Report and Written Opinion—PCT/US2022/075016—ISA/EPO—Nov. 25, 2022.

* cited by examiner

REFERENCE SIGNAL RECEIVED QUALITY FOR FULLY LOADED REFERENCE SIGNALS

CROSS-REFERENCE TO RELATED APPLICATION

This Patent application claims priority to U.S. Provisional Patent Application No. 63/260,304, filed on Aug. 16, 2021, entitled "REFERENCE SIGNAL RECEIVED QUALITY FOR RESYNCHRONIZATION SIGNALS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for determining reference signal received quality for fully loaded reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to measure a reference signal received power (RSRP) associated with a reference signal (RS) broadcast by a network. The one or more processors may further be configured to measure a received signal strength indicator (RSSI) using a plurality of resource elements (REs) that do not include the RS and excluding REs that do include the RS. The one or more processors may be configured to determine a reference signal received quality (RSRQ) associated with the RS based at least in part on the RSRP and the RSSI.

Some aspects described herein relate to an apparatus for wireless communication at a network entity. The apparatus may include a memory and one or more processors coupled to the memory. The one or more processors may be configured to transmit a configuration associated with measurement of an RS. The one or more processors may be further configured to broadcast the RS. The one or more processors may be configured to receive a report including an RSRQ associated with the RS, wherein the RSRQ is based at least in part on an RSRP associated with the RS and an RSSI measured using a plurality of REs that do not include the RS and excluding REs that do include the RS.

Some aspects described herein relate to a method of wireless communication performed by a UE. The method may include measuring an RSRP associated with an RS broadcast by a network. The method may further include measuring an RSSI using a plurality of REs that do not include the RS and excluding REs that do include the RS. The method may include determining an RSRQ associated with the RS based at least in part on the RSRP and the RSSI.

Some aspects described herein relate to a method of wireless communication performed by a network entity. The method may include transmitting a configuration associated with measurement of an RS. The method may further include broadcasting the RS. The method may include receiving a report including an RSRQ associated with the RS, wherein the RSRQ is based at least in part on an RSRP associated with the RS and an RSSI measured using a plurality of REs that do not include the RS and excluding REs that do include the RS.

Some aspects described herein relate to a non-transitory computer-readable medium that stores a set of instructions for wireless communication by a UE. The set of instructions, when executed by one or more processors of the UE, may cause the UE to measure an RSRP associated with an RS broadcast by a network. The set of instructions, when executed by one or more processors of the UE, may further cause the UE to measure an RSSI using a plurality of REs that do not include the RS and excluding REs that do include the RS. The set of instructions, when executed by one or more processors of the UE, may cause the UE to determine an RSRQ associated with the RS based at least in part on the RSRP and the RSSI.

Some aspects described herein relate to a non-transitory computer-readable medium that stores a set of instructions for wireless communication by a network entity. The set of instructions, when executed by one or more processors of the network entity, may cause the network entity to transmit a configuration associated with measurement of an RS. The set of instructions, when executed by one or more processors of the network entity, may further cause the network entity to broadcast the RS. The set of instructions, when executed by one or more processors of the network entity, may cause the network entity to receive a report including an RSRQ associated with the RS, wherein the RSRQ is based at least in part on an RSRP associated with the RS and an RSSI measured using a plurality of REs that do not include the RS and excluding REs that do include the RS.

Some aspects described herein relate to an apparatus for wireless communication. The apparatus may include means for measuring an RSRP associated with an RS broadcast by a network. The apparatus may further include means for measuring an RSSI using a plurality of REs that do not include the RS and excluding REs that do include the RS. The apparatus may include means for determining an RSRQ associated with the RS based at least in part on the RSRP and the RSSI.

Some aspects described herein relate to an apparatus for wireless communication. The apparatus may include means for transmitting a configuration associated with measurement of an RS. The apparatus may further include means for broadcasting the RS. The apparatus may include means for receiving a report including an RSRQ associated with the RS, wherein the RSRQ is based at least in part on an RSRP associated with the RS and an RSSI measured using a plurality of REs that do not include the RS and excluding REs that do include the RS.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
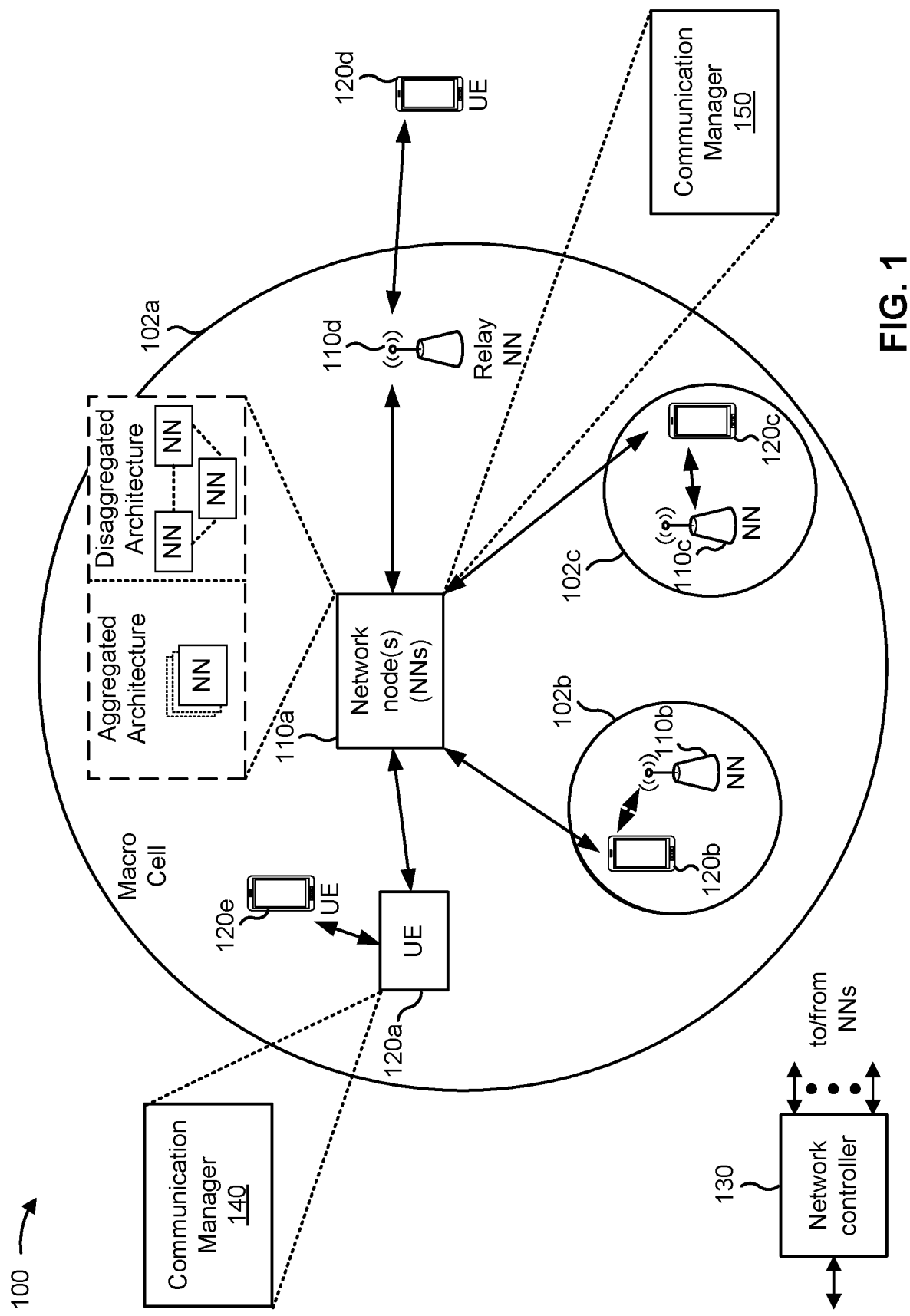
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device.

In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHz, FRI is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may measure a reference signal received power (RSRP) associated with a reference signal (RS) broadcast by a network (e.g., via the network node 110); measure a received signal strength indicator (RSSI) using a plurality of resource elements (REs) that do not include the RS and excluding REs that do include the RS; and determine a reference signal received quality (RSRQ) associated with the RS based at least in part on the RSRP and the RSSI. Additionally, or alternatively, the communication manager 140 may perform one or more other operations described herein.

In some aspects, a network entity (e.g., the network node 110) may include a communication manager 150. As described in more detail elsewhere herein, the communication manager 150 may transmit a configuration associated with measurement of an RS; broadcast the RS; and receive a report including an RSRQ associated with the RS, wherein the RSRQ is based at least in part on an RSRP associated with the RS and an RSSI measured using a plurality of REs that do not include the RS and excluding REs that do include the RS. Additionally, or alternatively, the communication manager 150 may perform one or more other operations described herein.

As indicated above, FIG. 1 is provided as an example. Other examples may differ from what is described with regard to FIG. 1.

Figure 2:
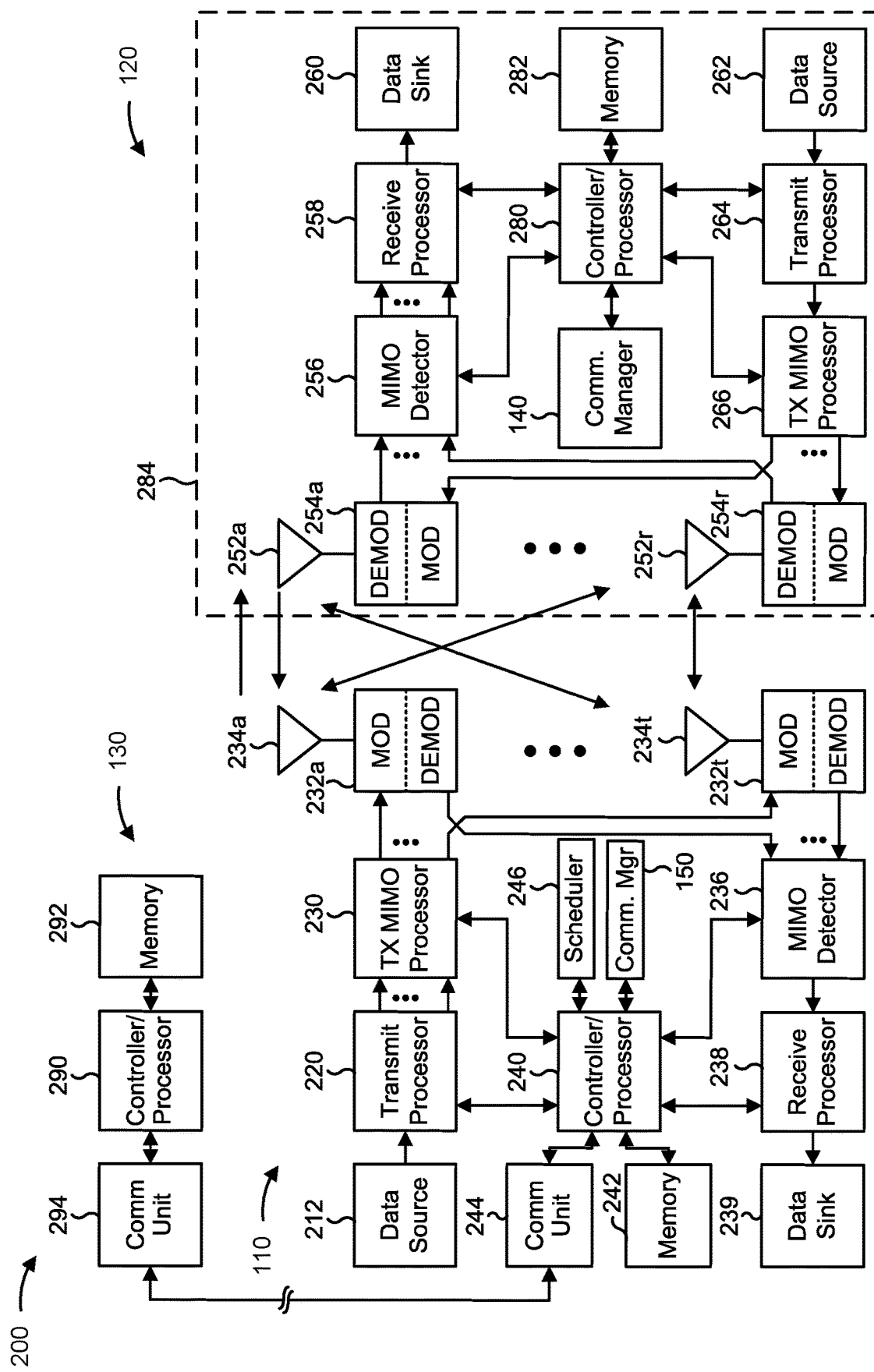
FIG. 2 is a diagram illustrating an example of a base station in communication with a user equipment in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine an RSRP parameter, an RSSI parameter, an RSRQ parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with determining RSRQ for fully loaded RSs, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 900 of FIG. 9) may include means for measuring an RSRP associated with an RS broadcast by a network; means for measuring an RSSI using a plurality of REs that do not include the RS and excluding REs that do include the RS; and/or means for determining an RSRQ associated with the RS based at least in part on the RSRP and the RSSI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the network node 110 and/or apparatus 1000 of FIG. 10) may include means for transmitting a configuration associated with measurement of an RS; means for broadcasting the RS; and/or means for receiving a report including an RSRQ associated with the RS, wherein the RSRQ is based at least in part on an RSRP associated with the RS and an RSSI measured using a plurality of REs that do not include the RS and excluding REs that do include the RS. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
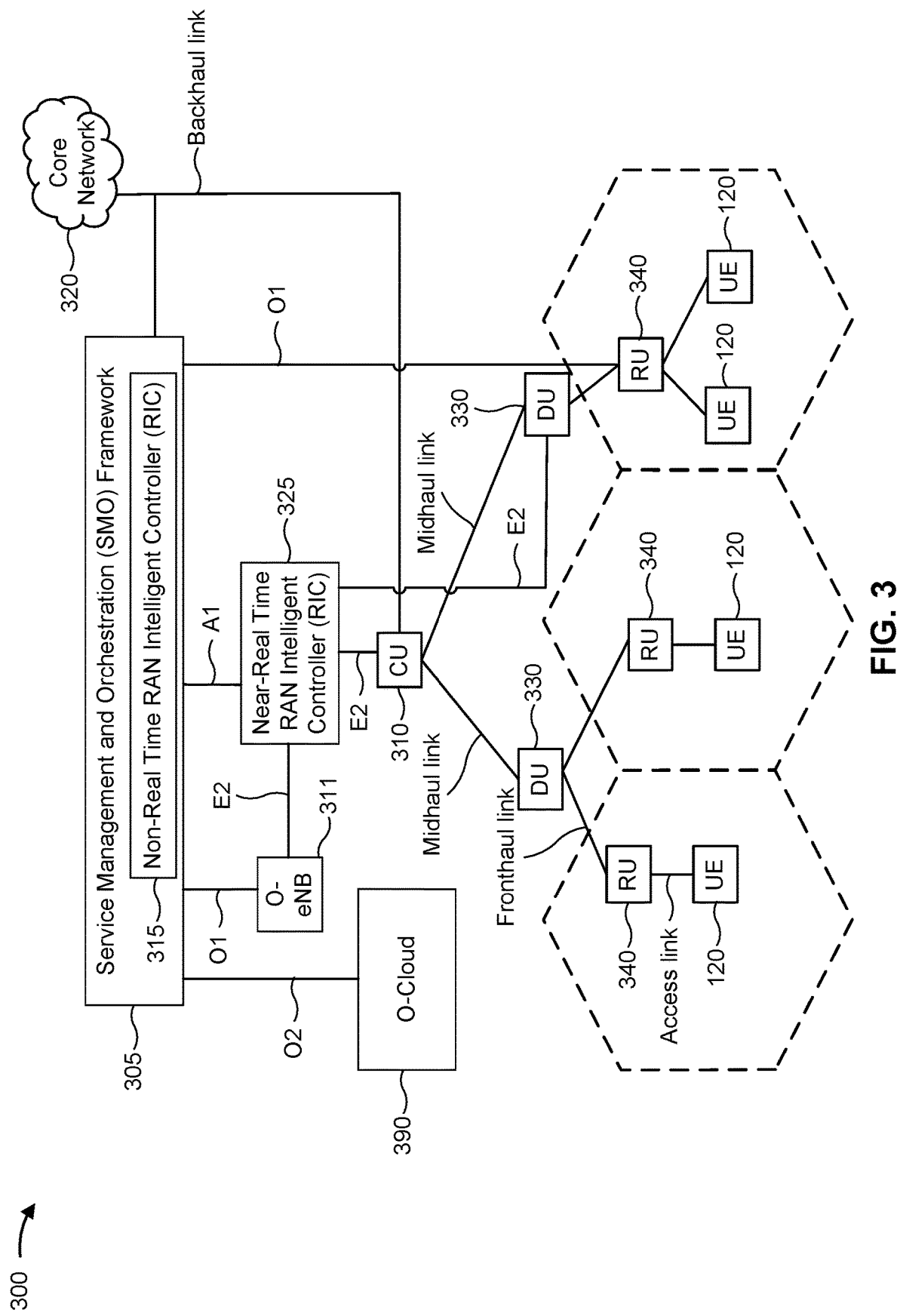
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
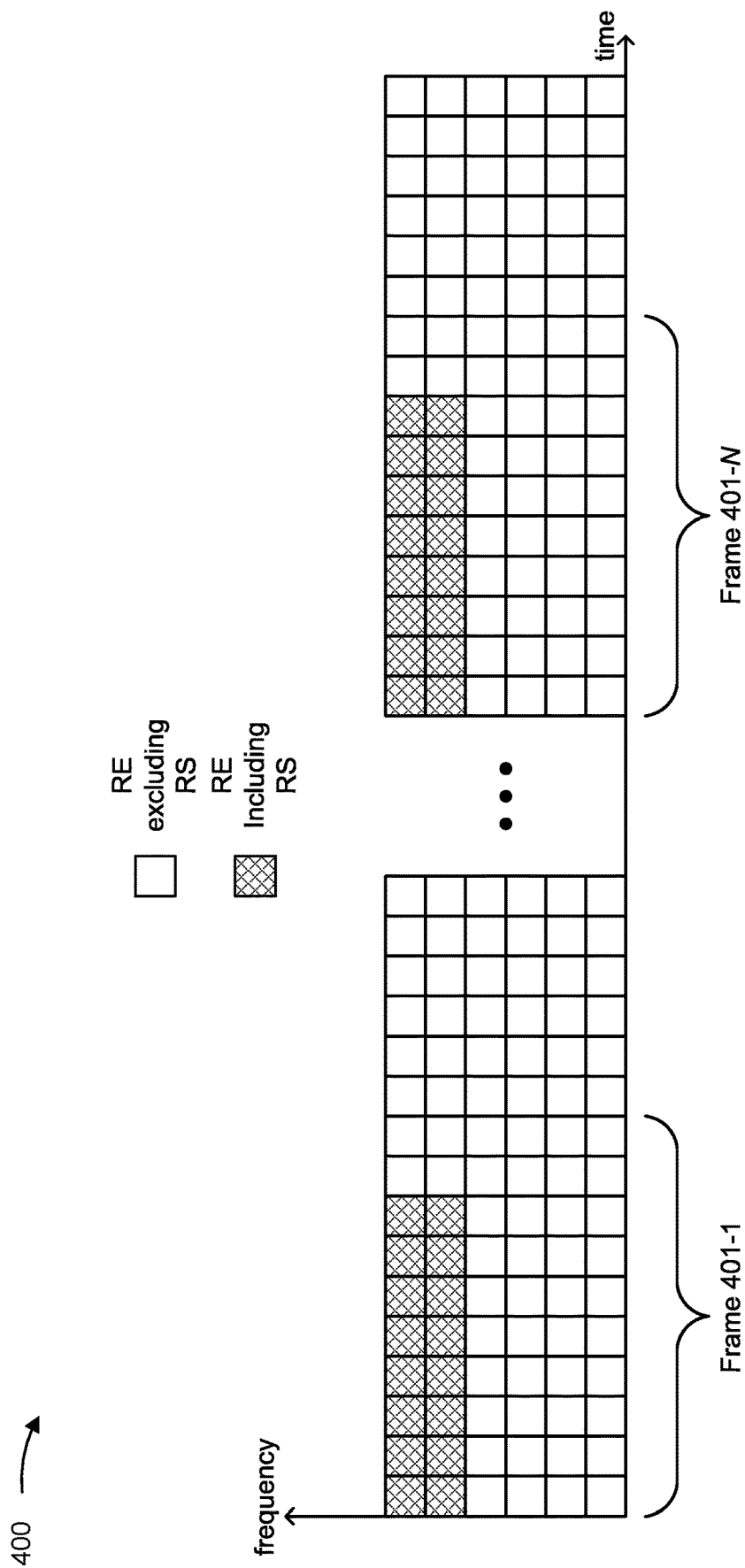
FIG. 4 is a diagram illustrating an example of a fully loaded reference signal (RS), in accordance with the present disclosure.

FIG. 4 is a diagram illustrating an example 400 of a fully loaded RS, in accordance with the present disclosure. The RS may be broadcast by a network node 110 (e.g., an RU 340 and/or a device controlling the RU 340, such as a DU 330 and/or a CU 310) to allow UEs (e.g., UE 120) to measure the RS and/or perform synchronizations, such as timing advance (TA) updates. As shown in FIG. 4, example 400 includes an RS that occupies a subset of resource blocks (RBs) within a subchannel. In example 400, the RS occupies a first two RBs within a total of six RBs of the subchannel. Although described herein as occupying a subset with two RBs from a set with a total of six RBs associated with a subchannel, the RS may occupy a smaller subset (e.g., one RB) or a larger subset (e.g., three RBs, four RBs, and so on) of the set. Additionally, or alternatively, the subchannel may be associated with a smaller set (e.g., five RBs, four RBs, and so on) or a larger set (e.g., seven RBs, eight RBs, and so on) of frequency resources.

As used herein, "resource block" or "RB" may refer to one or more subcarriers (e.g., each subcarrier may include one or more frequencies), which may be consecutive in a frequency domain. Accordingly, an RB may include a plurality of REs, where each RE corresponds to a single subcarrier. Additionally, each RE may correspond to a single symbol in a time domain (e.g., an OFDM symbol and/or another symbol according to a multiplexing scheme used by the network node 110).

As shown in FIG. 4, the RS may repeat in time. For example, the RS may be associated with a periodicity (e.g., 400 milliseconds (ms), 500 ms, and/or another periodicity). Additionally, in example 400, the RS is fully loaded. As used herein, "fully loaded" refers to an RS that is encoded across all symbols within at least one slot. In example 400, the RS may occupy a plurality of subframes. As used herein, "subframe" refers to a portion of a radio frame (e.g., frame 401-1 through frame 401-N in example 400) within an LTE, 5G, or other wireless communication structure, and includes more than one slot. Additionally, a slot includes more than one symbol. In example 400, the RS occupies eight consecutive subframes. Although described herein as occupying a subset with eight subframes from a set with a total of eighty subframes associated with the periodicity, the RS may occupy a smaller subset (e.g., seven subframes, six subframes, and so on) or a larger subset (e.g., nine subframes, ten subframes, and so on) of the set. Additionally, or alternatively, the periodicity may be associated with a smaller set (e.g., seventy-nine subframes, seventy-eight subframes, and so on) or a larger set (e.g., eighty-one subframes, eighty-two subframes, and so on) of time resources.

In some situations, a UE may measure an RSRQ associated with an RS. For example, a network may transmit, and the UE may receive, a channel state information (CSI) configuration and/or another measurement configuration instructing the UE to determine the RSRQ for the RS. The network may instruct the UE to measure an RS associated with a serving cell or an RS associated with a neighboring cell.

However, when the RS is a fully loaded signal, the UE calculates a larger RSSI measurement associated with the RS. Accordingly, an RSRQ value for the RS would be smaller than an RSRQ value for a comparable CRS or another signal that is not fully loaded. As a result, the UE and/or the network may select less optimal transmission parameters based on an RSRQ associated with the RS, which reduces quality and/or reliability of communications between the UE and the network. As a result, the UE and the network waste power and processing resources and increase network congestion by using increased quantities of retransmissions.

Some techniques and apparatuses described herein enable a UE (e.g., UE 120) to determine an RSRQ associated with an RS using an RSSI that is measured in a plurality of REs that do not include the RS and excluding REs that do include the RS. As a result, the UE 120 determines a more accurate RSRQ value such that the UE 120 and/or a network entity (e.g., network node 110) may select more optimal transmission parameters based on the RSRQ, which improves quality and/or reliability of communications between the UE 120 and the network node 110. As a result, the UE 120 and the network node 110 conserve power and processing resources and reduce network congestion by using reduced quantities of retransmissions.

As indicated above, FIG. 4 is provided as an example. Other examples may differ from what is described with respect to FIG. 4.

Figure 5:
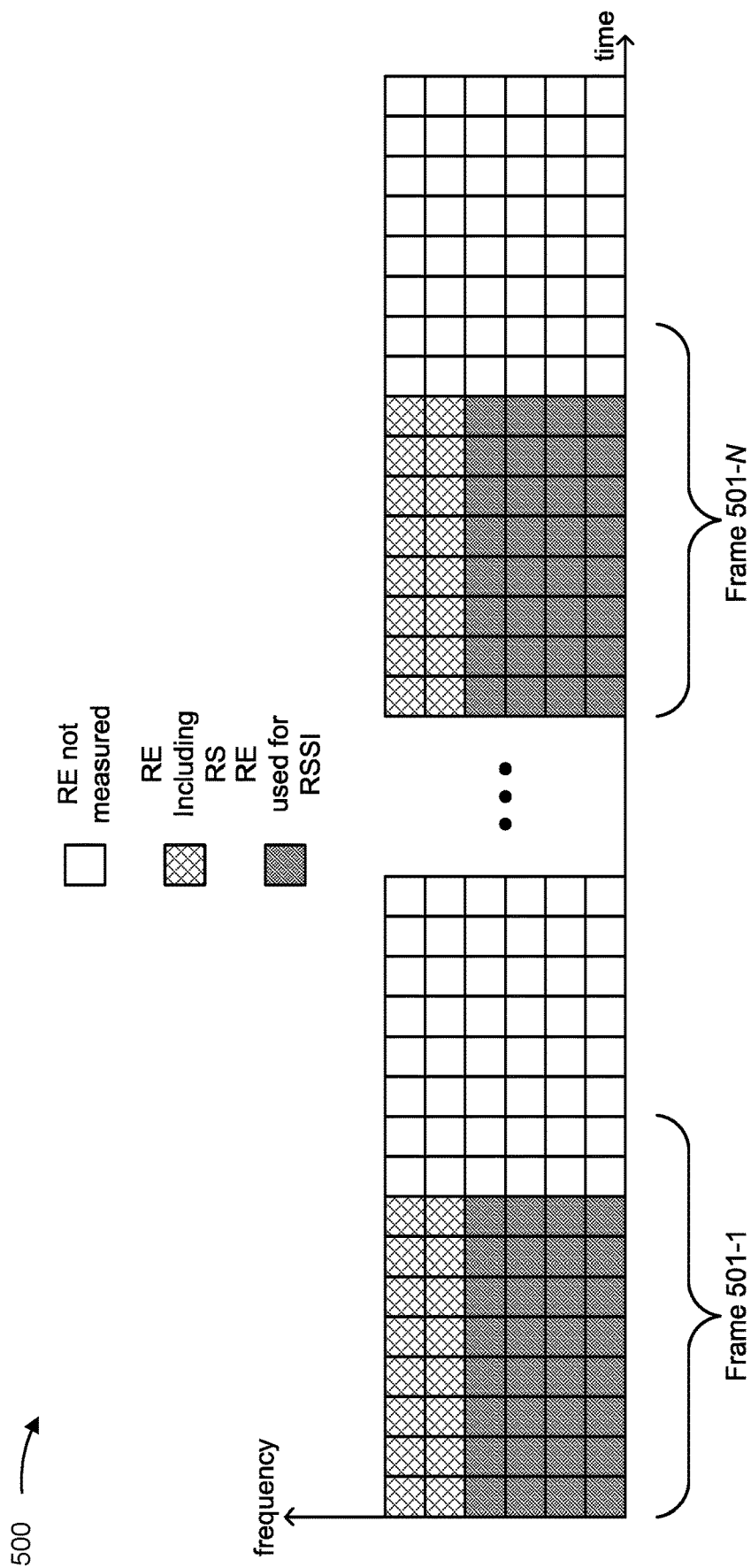
FIGS. 5 and 6 are diagrams illustrating examples associated with determining reference signal received quality (RSRQ) for an RS, in accordance with the present disclosure.

FIG. 5 is a diagram illustrating an example 500 associated with determining RSRQ for an RS, in accordance with the present disclosure. As shown in FIG. 5, example 500 includes an RS broadcast by a network (e.g., via network node 110) within a serving cell. Accordingly, a UE (e.g., UE 120) may measure the RS. For example, the network node 110 may transmit, and the UE 120 may receive, a configuration (e.g., a CSI configuration and/or another measurement configuration) associated with measurement of the RS. The configuration may instruct the UE 120 to measure an RSRQ associated with the RS. Although described with reference to the RS being transmitted by the network node 110 in the serving cell, the description similarly applies to the RS being transmitted by a network node in a neighboring cell.

To determine the RSRQ, the UE 120 may measure an RSRP associated with the RS. For example, the UE 120 may measure REs including the RS to determine the RSRP.

Additionally, to determine the RSRQ, the UE 120 may measure an RSSI using a plurality of REs that do not include the RS and excluding REs that do include the RS. In example 500, the RS is included in a subset of a set of RBs included in a narrow band. For example, the RS is included in a first two RBs out of a total of six RBs included in a subchannel. As used herein, "narrow band" refers to a channel (or subchannel) in which a bandwidth associated with a message on a channel does not significantly exceed the channel's (or the subchannel's) coherence bandwidth. For example, a "narrow band" may include a channel or subchannel that is associated with a bandwidth of 12.5 kHz or less.

As shown in FIG. 5, the UE 120 measures the RSSI in one or more RBs of the narrow band that do not include the subset of the set of RBs. For example, the RSSI is measured in the four RBs, out of the total of six RBs included in the subchannel, that do not include the RS.

Additionally, as shown in FIG. 5, the UE 120 measures the RSSI in one or more subframes that include the RS (e.g., in subframes of frame 501-1 through frame 501-N in example 500). As a result, there is no latency between when the UE 120 completes measurement of the RSRP and when the UE 120 completes measurement of the RSSI. The UE 120 may therefore conserve power by entering a low-power state sooner. In some aspects, the network node 110 may transmit, and the UE 120 may receive, system information (e.g., a system information block (SIB)) indicating a quantity of the one or more subframes. Accordingly, in example 500, the network node 110 may transmit an SIB indicating that the RS occupies eight subframes (e.g., out of a larger set of subframes associated with the periodicity of the RS, which may also be indicated in the SIB), such that the UE 120 measures the RSSI in the same eight subframes.

In example 500, and as described above, the RS occupies a portion of a narrow band, and the UE 120 measures the RSSI in the narrow band. As an alternative, the RS may occupy a portion of a first narrow band, and the UE 120 may measure the RSSI in a portion of a second narrow band. In some aspects, the network node 110 may transmit, and the UE 120 may receive, system information (e.g., an SIB) indicating the second narrow band. Accordingly, in example 500, the network node 110 may transmit a SIB indicating the first narrow band that includes the RS and the second narrow band that does not, such that the UE 120 measures the RSRP in the first narrow band and measures the RSSI in the second narrow band.

The UE 120 may use a combination of the first narrow band and the second narrow band to measure the RSSI. For example, the UE 120 may use one or more REs that do not include the RS in the first narrow band in combination with one or more REs from the second narrow band to measure the RSSI.

Accordingly, the UE 120 may determine the RSRQ associated with the RS based at least in part on the RSRP and the RSSI. In some aspects, the UE 120 may transmit, and the network node 110 may receive, a CSI report (and/or another report) including the RSRQ. Accordingly, the network node 110 may use the RSRQ to determine resources for transmitting to the UE 120 and/or for the UE 120 to transmit to the network node 110.

By using techniques as described in connection with FIG. 5, the UE 120 determines a more accurate RSRQ value such that the UE 120 and/or the network node 110 may select more optimal transmission parameters based on the RSRQ, which improves quality and/or reliability of communications between the UE 120 and the network node 110. As a result, the UE 120 and the network node 110 conserve power and processing resources and reduce network congestion by using reduced quantities of retransmissions.

As indicated above, FIG. 5 is provided as an example. Other examples may differ from what is described with respect to FIG. 5.

Figure 6:
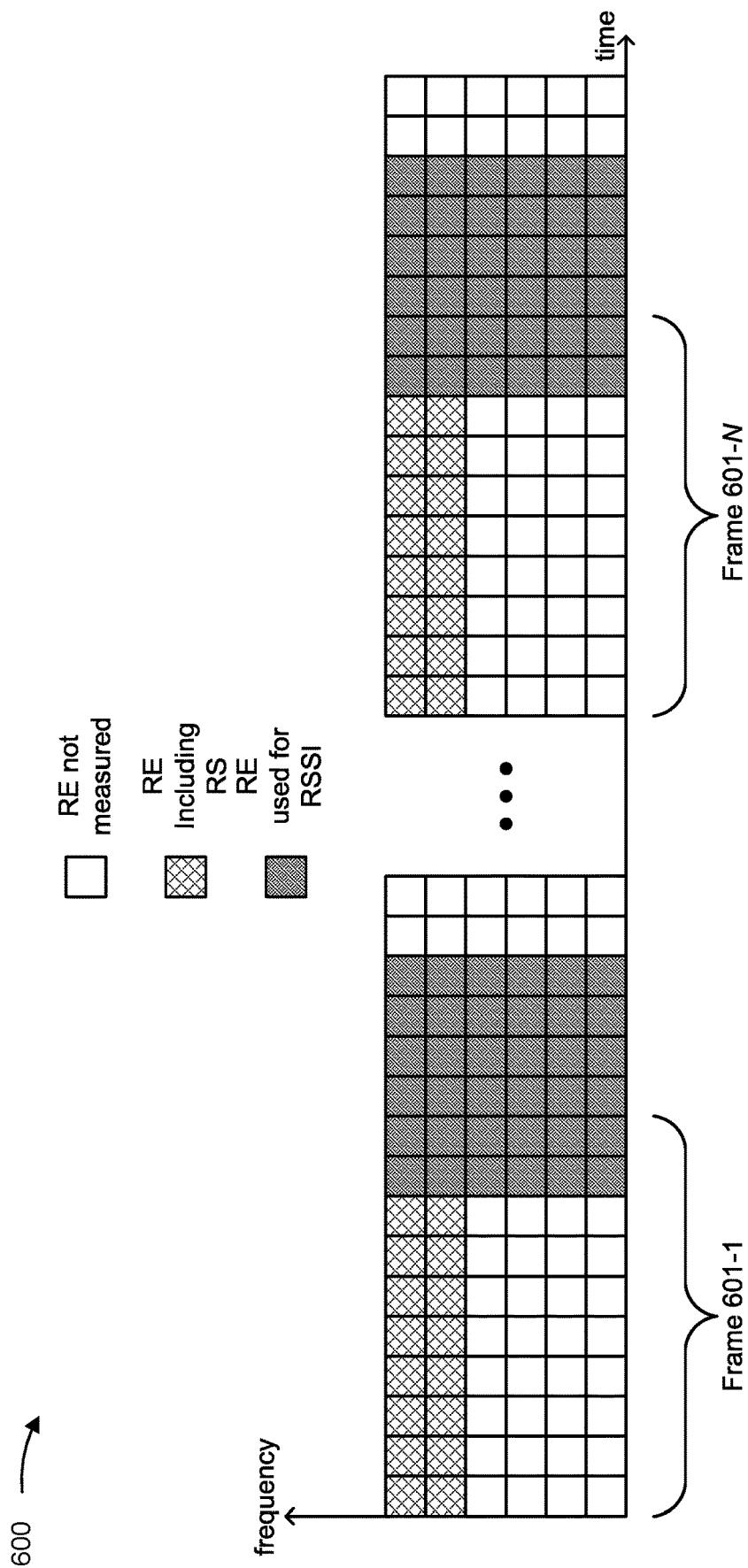

FIG. 6 is a diagram illustrating an example 600 associated with determining RSRQ for an RS, in accordance with the present disclosure. As shown in FIG. 6, example 600 includes an RS broadcast by a network (e.g., via network node 110) within a serving cell. Accordingly, a UE (e.g., UE 120) may measure the RS. For example, the network node 110 may transmit, and the UE 120 may receive, a configuration (e.g., a CSI configuration and/or another measurement configuration) associated with measurement of the RS. The configuration may instruct the UE 120 to measure an RSRQ associated with the RS. Although described with reference to the RS being transmitted by the network node 110 in the serving cell, the description similarly applies to the RS being transmitted by a network node in a neighboring cell.

To determine the RSRQ, the UE 120 may measure an RSRP associated with the RS. For example, the UE 120 may measure REs including the RS to determine the RSRP.

Additionally, to determine the RSRQ, the UE 120 may measure an RSSI using a plurality of REs that do not include the RS and excluding REs that do include the RS. In example 600, the RS is included in a subset of a set of RBs included in a narrow band. For example, the RS is included in a first two RBs out of a total of six RBs included in a subchannel.

As shown in FIG. 6, the UE 120 measures the RSSI in a set of RBs included in the narrow band that include the RS. For example, the RSSI is measured in six RBs included in the subchannel, including the two RBs that contain the RS.

Accordingly, as shown in FIG. 6, the UE 120 measures the RSSI in one or more subframes that do not include the RS. As a result, the UE 120 may conserve processing resources by calculating the RSRP separately from calculating the RSSI. In some aspects, the network node 110 may transmit, and the UE 120 may receive, system information (e.g., an SIB) indicating a quantity of a subset of a set of subframes included in a period associated with the RS. Accordingly, in example 600, the network node 110 may transmit a SIB indicating that the RS occupies a subset of eight subframes (e.g., out of a larger set of subframes associated with the periodicity of the RS, which may also be indicated in the SIB), such that the UE 120 measures the RSSI in different subframes than the eight subframes (e.g., the following six subframes in and after frame 601-1 through frame 601-N, in example 600). In some aspects, the UE 120 may select (and/or the network node 110 may indicate, e.g., in the SIB) a duration associated with measurement of the RSSI. For example, the duration associated with measuring the RSSI may be the same duration (or a larger duration or a smaller duration) as associated with the subset of subframes including the RS.

In example 600, and as described above, the RS occupies a portion of a narrow band, and the UE 120 measures the RSSI in the narrow band. As an alternative, the RS may occupy a portion of a first narrow band, and the UE 120 may measure the RSSI in a portion of a second narrow band. In some aspects, the network node 110 may transmit, and the UE 120 may receive, system information (e.g., an SIB) indicating the second narrow band. Accordingly, in example 600, the network node 110 may transmit a SIB indicating the first narrow band that includes the RS and the second narrow band that does not include the RS, such that the UE 120 measures the RSRP in the first narrow band and measures the RSSI in the second narrow band.

The UE 120 may use a combination of the first narrow band and the second narrow band to measure the RSSI. For example, the UE 120 may use one or more REs that do not include the RS in the first narrow band in combination with one or more REs from the second narrow band to measure the RSSI.

Additionally, or alternatively, example 600 may be combined with example 500. For example, the UE 120 may use one or more REs included in different subframes than the RS (as shown in FIG. 6) in combination with one or more REs included in a same subframe as the RS (as shown in FIG. 5) to measure the RSSI.

Accordingly, the UE 120 may determine the RSRQ associated with the RS based at least in part on the RSRP and the RSSI. In some aspects, the UE 120 may transmit, and the network node 110 may receive, a CSI report (and/or another report) including the RSRQ. Accordingly, the network node 110 may use the RSRQ to determine resources for transmitting to the UE 120 and/or for the UE 120 to transmit to the network node 110.

By using techniques as described in connection with FIG. 6, the UE 120 determines a more accurate RSRQ value such that the UE 120 and/or the network node 110 may select more optimal transmission parameters based on the RSRQ, which improves quality and/or reliability of communications between the UE 120 and the network node 110. As a result, the UE 120 and the network node 110 conserve power and processing resources and reduce network congestion by using reduced quantities of retransmissions.

As indicated above, FIG. 6 is provided as an example. Other examples may differ from what is described with respect to FIG. 6.

Figure 7:
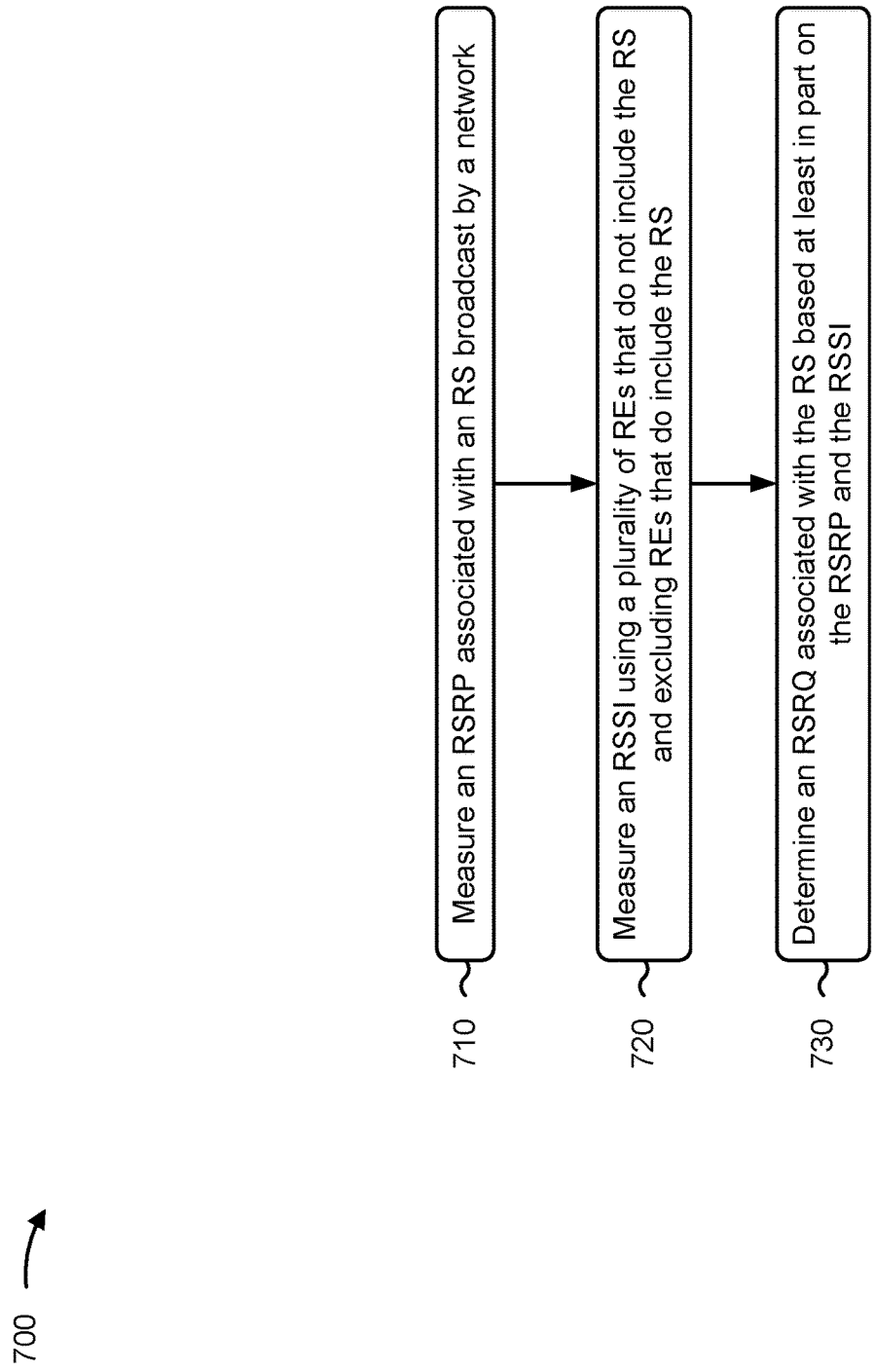
FIGS. 7 and 8 are diagrams illustrating example processes associated with determining RSRQ for RSs, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 900 of FIG. 9) performs operations associated with determining RSRQ for fully loaded RSs.

As shown in FIG. 7, in some aspects, process 700 may include measuring an RSRP associated with an RS broadcast by a network (e.g., via network node 110 and/or apparatus 1000 of FIG. 10) (block 710). For example, the UE (e.g., using communication manager 140 and/or measurement component 908, depicted in FIG. 9) may measure an RSRP associated with an RS broadcast by a network, as described herein.

As further shown in FIG. 7, in some aspects, process 700 may include measuring an RSSI using a plurality of REs that do not include the RS and excluding REs that do include the RS (block 720). For example, the UE (e.g., using communication manager 140 and/or measurement component 908) may measure an RSSI using a plurality of REs that do not include the RS and excluding REs that do include the RS, as described herein.

As further shown in FIG. 7, in some aspects, process 700 may include determining an RSRQ associated with the RS based at least in part on the RSRP and the RSSI (block 730). For example, the UE (e.g., using communication manager 140 and/or determination component 910, depicted in FIG. 9) may determine an RSRQ associated with the RS based at least in part on the RSRP and the RSSI, as described herein.

Process 700 may include additional aspects, such as any single aspect or any combination of aspects described below and/or in connection with one or more other processes described elsewhere herein.

In a first aspect, the RS is included in a subset of a set of RBs included in a narrow band.

In a second aspect, alone or in combination with the first aspect, the RSSI is measured in one or more RBs of the narrow band that do not include the subset of the set of RBs.

In a third aspect, alone or in combination with one or more of the first and second aspects, the RSSI is measured in one or more subframes that include the RS.

Figure 9:
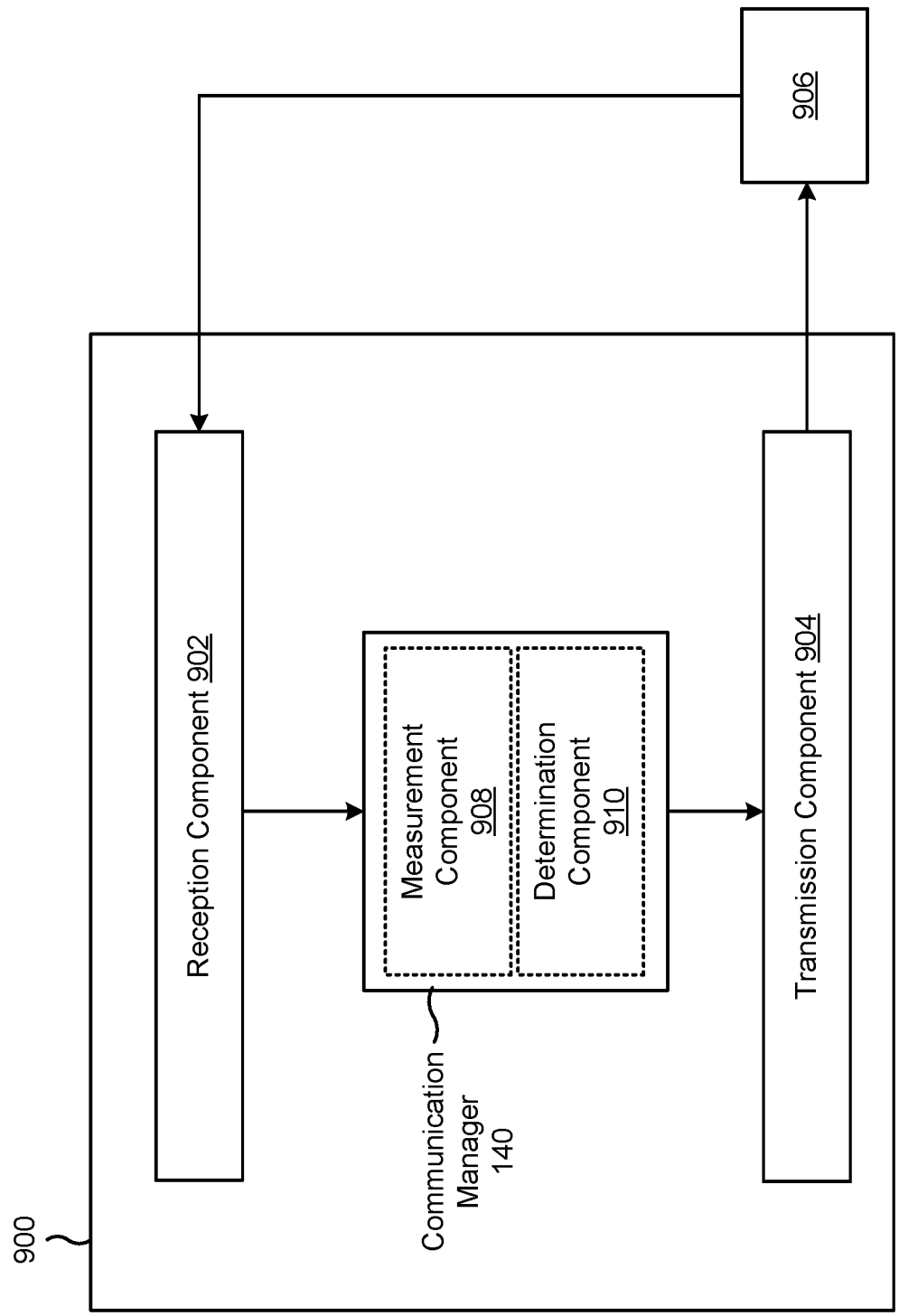
FIGS. 9 and 10 are diagrams of example apparatuses for wireless communication, in accordance with the present disclosure.

In a fourth aspect, alone or in combination with one or more of the first through third aspects, process 700 further includes receiving (e.g., using communication manager 140 and/or reception component 902, depicted in FIG. 9) system information indicating a quantity of the one or more subframes.

In a fifth aspect, alone or in combination with one or more of the first through fourth aspects, the RSSI is measured in the set of RBs.

In a sixth aspect, alone or in combination with one or more of the first through fifth aspects, the RS occupies a subset of a set of subframes included in a period associated with the RS.

In a seventh aspect, alone or in combination with one or more of the first through sixth aspects, process 700 further includes receiving (e.g., using communication manager 140 and/or reception component 902) system information indicating a quantity of subframes in the subset of the set of subframes.

In an eighth aspect, alone or in combination with one or more of the first through seventh aspects, the RSSI is measured in one or more subframes that do not include the subset of the set of subframes.

In a ninth aspect, alone or in combination with one or more of the first through eighth aspects, a duration associated with the subset of the set of subframes is associated with measurement of the RSSI.

In a tenth aspect, alone or in combination with one or more of the first through ninth aspects, process 700 further includes receiving (e.g., using communication manager 140 and/or reception component 902) system information indicating a quantity of subframes for measurement of the RSSI.

In an eleventh aspect, alone or in combination with one or more of the first through tenth aspects, the RS occupies a portion of a narrow band, and the RSSI is measured in the narrow band.

In a twelfth aspect, alone or in combination with one or more of the first through eleventh aspects, the RS occupies a portion of a first narrow band, and the RSSI is measured in a portion of a second narrow band.

In a thirteenth aspect, alone or in combination with one or more of the first through twelfth aspects, process 700 further includes receiving (e.g., using communication manager 140 and/or reception component 902) system information indicating the second narrow band.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
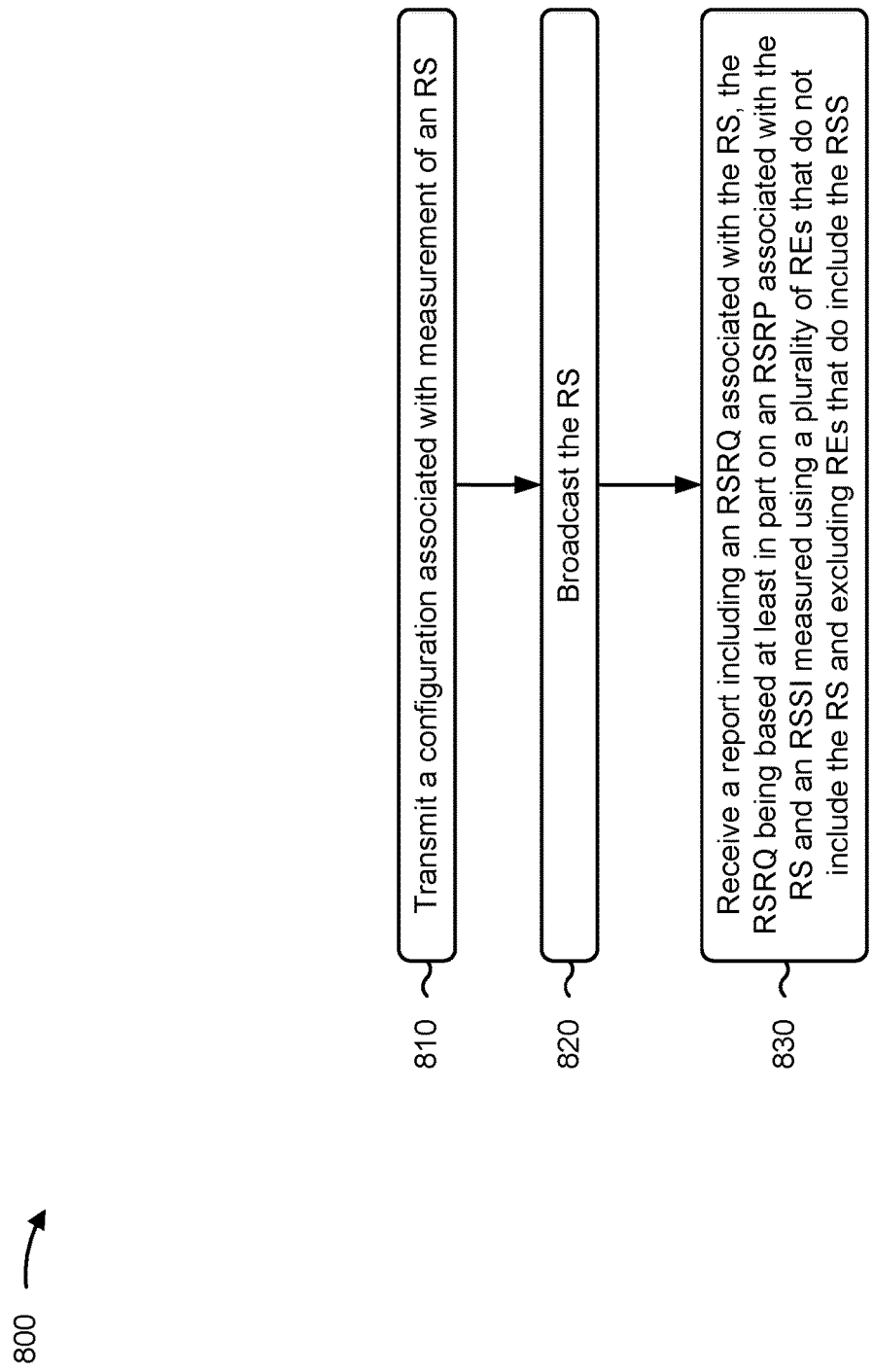

FIG. 8 is a diagram illustrating an example process 800 performed, for example, by a network entity, in accordance with the present disclosure. Example process 800 is an example where the network entity (e.g., network node 110 and/or apparatus 1000 of FIG. 10) performs operations associated with receiving RSRQ for fully loaded RSs.

As shown in FIG. 8, in some aspects, process 800 may include transmitting (e.g., to UE 120 and/or apparatus 900 of FIG. 9) a configuration associated with measurement of an RS (block 810). For example, the network entity (e.g., using communication manager 150 and/or transmission component 1004, depicted in FIG. 10) may transmit a configuration associated with measurement of an RS, as described herein.

As further shown in FIG. 8, in some aspects, process 800 may include broadcasting the RS (block 820). For example, the network entity (e.g., using communication manager 150 and/or broadcasting component 1008, depicted in FIG. 10) may broadcast the RS, as described herein.

As further shown in FIG. 8, in some aspects, process 800 may include receiving a report including an RSRQ associated with the RS (block 830). For example, the network entity (e.g., using communication manager 150 and/or reception component 1002, depicted in FIG. 10) may receive a report including an RSRQ associated with the RS, as described herein. In some aspects, the RSRQ is based at least in part on an RSRP associated with the RS and an RSSI measured using a plurality of REs that do not include the RS and excluding REs that do include the RS.

Process 800 may include additional aspects, such as any single aspect or any combination of aspects described below and/or in connection with one or more other processes described elsewhere herein.

In a first aspect, the RS is included in a subset of a set of RBs included in a narrow band.

In a second aspect, alone or in combination with the first aspect, the RSSI was measured in one or more RBs of the narrow band that do not include the subset of the set of RBs.

In a third aspect, alone or in combination with one or more of the first and second aspects, the RSSI was measured in one or more subframes that include the RS.

In a fourth aspect, alone or in combination with one or more of the first through third aspects, the configuration includes system information that indicates a quantity of the one or more subframes.

In a fifth aspect, alone or in combination with one or more of the first through fourth aspects, the RSSI was measured in the set of RBs.

In a sixth aspect, alone or in combination with one or more of the first through fifth aspects, the RS occupies a subset of a set of subframes included in a period associated with the RS.

In a seventh aspect, alone or in combination with one or more of the first through sixth aspects, the configuration includes system information that indicates a quantity of subframes in the subset of the set of subframes.

In an eighth aspect, alone or in combination with one or more of the first through seventh aspects, the RSSI was measured in one or more subframes that do not include the subset of the set of subframes.

In a ninth aspect, alone or in combination with one or more of the first through eighth aspects, a duration associated with the subset of the set of subframes is associated with measurement of the RSSI.

In a tenth aspect, alone or in combination with one or more of the first through ninth aspects, the configuration comprises system information that indicates a quantity of subframes for measurement of the RSSI.

In an eleventh aspect, alone or in combination with one or more of the first through tenth aspects, the RS occupies a portion of a narrow band, and the RS was measured in the narrow band.

In a twelfth aspect, alone or in combination with one or more of the first through eleventh aspects, the RS occupies a portion of a first narrow band, and the RSSI was measured in a portion of a second narrow band.

In a thirteenth aspect, alone or in combination with one or more of the first through twelfth aspects, the configuration includes system information that indicates the second narrow band.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, an RU, or another wireless communication device) using the reception component 902 and the transmission component 904. As further shown, the apparatus 900 may include the communication manager 140. The communication manager 140 may include one or more of a measurement component 908 and/or a determination component 910, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

In some aspects, the measurement component 908 may measure an RSRP associated with an RS broadcast by a network (e.g., via an RU, such as the apparatus 906, or by an apparatus in a neighboring cell). Additionally, the measurement component 908 may measure an RSSI using a plurality of REs that do not include the RS and excluding REs that do include the RS. The measurement component 908 may include one or more antennas, a modem, a demodulator, a MIMO detector, a receive processor, a controller/processor, a memory, or a combination thereof, of the UE described in connection with FIG. 2. Accordingly, the determination component 910 may determine an RSRQ associated with the RS based at least in part on the RSRP and the RSSI. The determination component 910 may include a modem, a demodulator, a MIMO detector, a receive processor, a controller/processor, a memory, or a combination thereof, of the UE described in connection with FIG. 2. In some aspects, the reception component 902 may receive (e.g., from the apparatus 906) a configuration associated with measurement of the RS.

In some aspects, the reception component 902 may further receive (e.g., from the apparatus 906) system information (e.g., a SIB) indicating a quantity of subframes including the RS. Additionally, or alternatively, the reception component 902 may receive (e.g., from the apparatus 906) system information (e.g., a SIB) indicating a quantity of subframes for measurement of the RSSI. Additionally, or alternatively, reception component 902 may receive (e.g., from the apparatus 906) system information (e.g., a SIB) indicating a second narrow band for measurement of the RSSI.

In some aspects, the transmission component 904 may transmit (e.g., to the apparatus 906) a report (e.g., a CSI report) including the RSRQ associated with the RS. Additionally, or alternatively, the transmission component 904 may select one or more resources for transmission (e.g., to the apparatus 906) based at least in part on the RSRQ associated with the RS.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
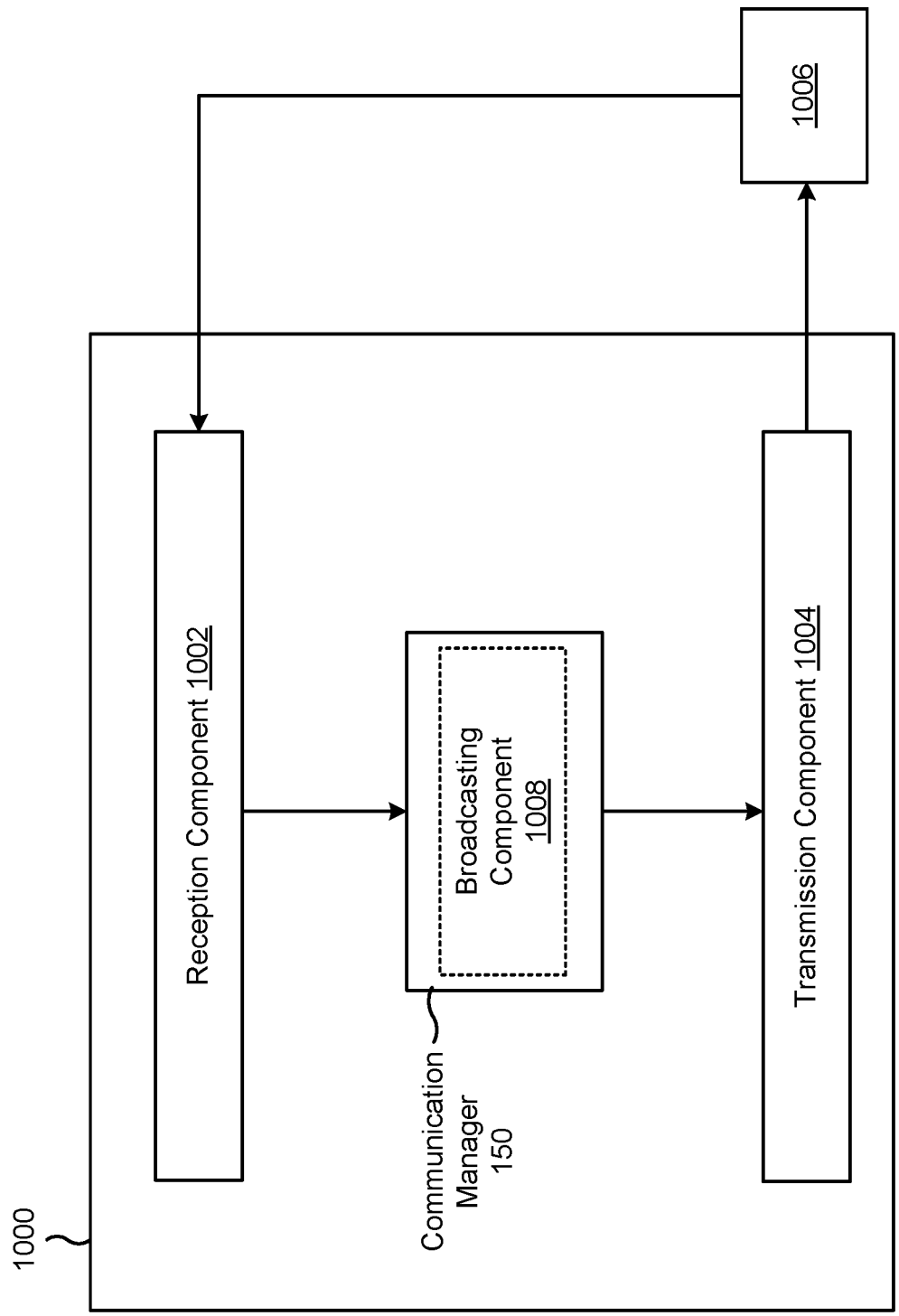

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, an RU, or another wireless communication device) using the reception component 1002 and the transmission component 1004. As further shown, the apparatus 1000 may include the communication manager 150. The communication manager 150 may include a broadcasting component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

In some aspects, the transmission component 1004 may transmit (e.g., to a UE, such as the apparatus 1006) a configuration associated with measurement of an RS. Accordingly, the broadcasting component 1008 may broadcast the RS. The broadcasting component 1008 may include one or more antennas, a modem, a modulator, a transmit MIMO processor, a transmit processor, a controller/processor, a memory, or a combination thereof, of the network node described in connection with FIG. 2. As an alternative, the RS may be associated with a neighboring cell such that a different apparatus broadcasts the RS.

Accordingly, the reception component 1002 may receive (e.g., from the apparatus 1006) a report (e.g., a CSI report) including an RSRQ associated with the RS. The RSRQ may be based at least in part on an RSRP associated with the RS and an RSSI measured using a plurality of REs that do not include the RS and excluding REs that do include the RS.

In some aspects, the transmission component 1004 may transmit (e.g., to the apparatus 1006) a resource assignment based at least in part on the RSRQ associated with the RS. Additionally, or alternatively, the transmission component 1004 may select one or more resources for transmission (e.g., to the apparatus 1006) based at least in part on the RSRQ associated with the RS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: measuring a reference signal received power (RSRP) associated with a reference signal (RS) broadcast by a network; measuring a received signal strength indicator (RSSI) using a plurality of resource elements (REs) that do not include the RS and excluding REs that do include the RS; and determining a reference signal received quality (RSRQ) associated with the RS based at least in part on the RSRP and the RSSI.

Aspect 2: The method of Aspect 1, wherein the RS is included in a subset of a set of resource blocks (RBs) included in a narrow band.

Aspect 3: The method of Aspect 2, wherein the RSSI is measured in one or more RBs of the narrow band that do not include the subset of the set of RBs.

Aspect 4: The method of Aspect 3, wherein the RSSI is measured in one or more subframes that include the RS.

Aspect 5: The method of Aspect 4, further comprising: receiving system information indicating a quantity of the one or more subframes.

Aspect 6: The method of Aspect 2, wherein the RSSI is measured in the set of RBs.

Aspect 7: The method of Aspect 6, wherein the RS occupies a subset of a set of subframes included in a period associated with the RS.

Aspect 8: The method of Aspect 7, further comprising: receiving, system information indicating a quantity of subframes in the subset of the set of subframes.

Aspect 9: The method of any of Aspects 7 through 8, wherein the RSSI is measured in one or more subframes that do not include the subset of the set of subframes.

Aspect 10: The method of any of Aspects 7 through 9, wherein a duration associated with the subset of the set of subframes is associated with measurement of the RSSI.

Aspect 11: The method of any of Aspects 7 through 10, further comprising: receiving system information indicating a quantity of subframes for measurement of the RSSI.

Aspect 12: The method of any of Aspects 1 through 11, wherein the RS occupies a portion of a narrow band, and the RSSI is measured in the narrow band.

Aspect 13: The method of any of Aspects 1 through 12, wherein the RS occupies a portion of a first narrow band, and the RSSI is measured in a portion of a second narrow band.

Aspect 14: The method of Aspect 13, further comprising: receiving system information indicating the second narrow band.

Aspect 15: A method of wireless communication performed by a network entity, comprising: transmitting a configuration associated with measurement of a reference signal (RS); broadcasting the RS; and receiving a report including a reference signal received quality (RSRQ) associated with the RS, wherein the RSRQ is based at least in part on a reference signal received power (RSRP) associated with the RS and a received signal strength indicator (RSSI) measured using a plurality of resource elements (REs) that do not include the RS and excluding REs that do include the RS.

Aspect 16: The method of Aspect 15, wherein the RS is included in a subset of a set of resource blocks (RBs) included in a narrow band.

Aspect 17: The method of Aspect 16, wherein the RSSI was measured in one or more RBs of the narrow band that do not include the subset of the set of RBs.

Aspect 18: The method of Aspect 17, wherein the RSSI was measured in one or more subframes that include the RS.

Aspect 19: The method of Aspect 18, the configuration comprises system information that indicates a quantity of the one or more subframes.

Aspect 20: The method of Aspect 16, wherein the RSSI was measured in the set of RBs.

Aspect 21: The method of Aspect 20, wherein the RS occupies a subset of a set of subframes included in a period associated with the RS.

Aspect 22: The method of Aspect 21, the configuration comprises system information that indicates a quantity of subframes in the subset of the set of subframes.

Aspect 23: The method of any of Aspects 21 through 22, wherein the RSSI was measured in one or more subframes that do not include the subset of the set of subframes.

Aspect 24: The method of any of Aspects 21 through 23, wherein a duration associated with the subset of the set of subframes is associated with measurement of the RSSI.

Aspect 25: The method of any of Aspects 21 through 24, the configuration comprises system information that indicates a quantity of subframes for measurement of the RSSI.

Aspect 26: The method of any of Aspects 15 through 25, wherein the RS occupies a portion of a narrow band, and the RSSI was measured in the narrow band.

Aspect 27: The method of any of Aspects 15 through 26, wherein the RS occupies a portion of a first narrow band, and the RSSI was measured in a portion of a second narrow band.

Aspect 28: The method of Aspect 27, the configuration comprises system information that indicates the second narrow band.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
 a memory; and
 one or more processors, coupled to the memory, configured to:
  measure a reference signal received power (RSRP) associated with a reference signal (RS) broadcast by a network wherein the RS is included in a subset of a set of resource blocks (RBs) included in a narrow band;
  measure a received signal strength indicator (RSSI) using a plurality of resource elements (REs) that do not include the RS and excluding REs that do include the RS wherein the RSSI is measured in one or more RBs of the narrow band that do not include the subset of the set of RBs; and
  determine a reference signal received quality (RSRQ) associated with the RS based at least in part on the RSRP and the RSSI.

2. The apparatus of claim 1, wherein the RSSI is measured in one or more subframes that include the RS.

3. The apparatus of claim 2, wherein the one or more processors are further configured to:
 receive system information indicating a quantity of the one or more subframes.

4. The apparatus of claim 1, wherein the RSSI is measured in the set of RBs.

5. The apparatus of claim 4, wherein the RS occupies a subset of a set of subframes included in a period associated with the RS.

6. The apparatus of claim 5, wherein the one or more processors are further configured to:
 receive system information indicating a quantity of subframes in the subset of the set of subframes.

7. The apparatus of claim 5, wherein the RSSI is measured in one or more subframes that do not include the subset of the set of subframes.

8. The apparatus of claim 7, wherein a duration associated with the subset of the set of subframes is associated with measurement of the RSSI.

9. The apparatus of claim 7, wherein the one or more processors are further configured to:
 receive system information indicating a quantity of subframes for measurement of the RSSI.

10. The apparatus of claim 1, wherein the RS occupies a portion of a narrow band, and the RSSI is measured in the narrow band.

11. The apparatus of claim 1, wherein the RS occupies a portion of a first narrow band, and the RSSI is measured in a portion of a second narrow band.

12. The apparatus of claim 11, wherein the one or more processors are further configured to:
 receive system information indicating the second narrow band.

13. An apparatus for wireless communication at a network entity, comprising:
 a memory; and
 one or more processors, coupled to the memory, configured to:
  transmit a configuration associated with measurement of a reference signal (RS) wherein the RS is included in a subset of a set of resource blocks (RBs) included in a narrow band;
  broadcast the RS; and
  receive a report including a reference signal received quality (RSRQ) associated with the RS, wherein the RSRQ is based at least in part on a reference signal received power (RSRP) associated with the RS and a received signal strength indicator (RSSI) measured using a plurality of resource elements (REs) that do not include the RS and excluding REs that do include the RS wherein the RSSI was measured in one or more RBs of the narrow band that do not include the subset of the set of RBs.

14. The apparatus of claim 13, wherein the RSSI was measured in one or more subframes that include the RS.

15. The apparatus of claim 14, wherein the configuration comprises system information that indicates a quantity of the one or more subframes.

16. The apparatus of claim 13, wherein the RSSI was measured in the set of RBs.

17. The apparatus of claim 16, wherein the RS occupies a subset of a set of subframes included in a period associated with the RS.

18. The apparatus of claim 17, wherein the configuration comprises system information that indicates a quantity of subframes in the subset of the set of subframes.

19. The apparatus of claim 17, wherein the RSSI was measured in one or more subframes that do not include the subset of the set of subframes.

20. The apparatus of claim 19, wherein a duration associated with the subset of the set of subframes is associated with measurement of the RSSI.

21. The apparatus of claim 19, wherein the configuration comprises system information that indicates a quantity of subframes for measurement of the RSSI.

22. The apparatus of claim 13, wherein the RS occupies a portion of a narrow band, and the RSSI was measured in the narrow band.

23. The apparatus of claim 13, wherein the RS occupies a portion of a first narrow band, and the RSSI was measured in a portion of a second narrow band.

24. The apparatus of claim 23, wherein the configuration comprises system information that indicates the second narrow band.

25. A method of wireless communication performed by a user equipment (UE), comprising:
 measuring a reference signal received power (RSRP) associated with a reference signal (RS) broadcast by a network wherein the RS is included in a subset of a set of resource blocks (RBs) included in a narrow band;
 measuring a received signal strength indicator (RSSI) using a plurality of resource elements (REs) that do not include the RS and excluding REs that do include the RS wherein the RSSI is measured in one or more RBs of the narrow band that do not include the subset of the set of RBs; and
 determining a reference signal received quality (RSRQ) associated with the RS based at least in part on the RSRP and the RSSI.

26. A method of wireless communication performed by a network entity, comprising:
 transmitting a configuration associated with measurement of a reference signal (RS); broadcasting the RS wherein the RS is included in a subset of a set of resource blocks (RBs) included in a narrow band; and receiving a report including a reference signal received quality (RSRQ) associated with the RS, wherein the RSRQ is based at least in part on a reference signal received power (RSRP) associated with the RS and a received signal strength indicator (RSSI) measured using a plurality of resource elements (REs) that do not include the RS and excluding REs that do include the RS wherein the RSSI is measured in one or more RBs of the narrow band that do not include the subset of the set of RBs.

* * * * *